(12) United States Patent
Hagh et al.

(10) Patent No.: US 9,604,730 B2
(45) Date of Patent: Mar. 28, 2017

(54) AIRCRAFT SYSTEMS AND METHODS WITH INTEGRATED TANK INERTING AND POWER GENERATION

(71) Applicant: HONEYWELL INTERNATIONAL INC., Morristown, NJ (US)

(72) Inventors: Bijan F. Hagh, Newport Beach, CA (US); Daguang Zheng, Torrance, CA (US); Russell W. Johnson, Elmhurst, IL (US); Mukund Acharya, Sunnyvale, CA (US); Mario Scaini, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 365 days.

(21) Appl. No.: 14/227,689

(22) Filed: Mar. 27, 2014

(65) Prior Publication Data

US 2015/0353201 A1    Dec. 10, 2015

(51) Int. Cl.
*B64D 41/00* (2006.01)
*B64D 37/32* (2006.01)
(Continued)

(52) U.S. Cl.
CPC .............. *B64D 37/32* (2013.01); *A62C 3/065* (2013.01); *A62C 3/08* (2013.01);
(Continued)

(58) Field of Classification Search
CPC .. B64D 37/32; B64D 37/34; B64D 2041/005; A62C 3/065; Y02T 90/36
See application file for complete search history.

(56) References Cited

U.S. PATENT DOCUMENTS

| | | | | | |
|---|---|---|---|---|---|
| 6,834,831 | B2* | 12/2004 | Daggett | ................ | B64D 41/00 244/118.5 |
| 7,759,011 | B2* | 7/2010 | Hoffjann | ................ | B64D 37/32 244/135 R |

(Continued)

FOREIGN PATENT DOCUMENTS

| | | |
|---|---|---|
| EP | 1902954 A2 | 3/2008 |
| GB | 2442309 A | 4/2008 |
| WO | 2006058774 A2 | 6/2006 |

OTHER PUBLICATIONS

Extended EP search report for EP 15158708.6-1757 dated Sep. 8, 2015.

*Primary Examiner* — Brian M O'Hara
(74) *Attorney, Agent, or Firm* — Lorenz & Kopf, LLP

(57) ABSTRACT

A system is provided for inerting a fuel tank of an aircraft. The system includes a first compressor fluidly coupled to the fuel tank for removing an air and fuel vapor mixture from an ullage of the fuel tank. The system further includes a fuel processor fluidly coupled to the first compressor and configured to receive the air and fuel vapor mixture and to generate hydrogen from the air and fuel vapor mixture. The system further includes a fuel cell fluidly coupled to the fuel processor and configured to receive the hydrogen as anode fuel to produce electricity. The system further includes a combustor fluidly coupled to the fuel cell and configured to combust the exhaust product to produce combustion gas, and a first heat exchanger fluidly coupled to the combustor and configured to cool the combustion gas into inerting gas for the fuel tank.

14 Claims, 8 Drawing Sheets

(51) Int. Cl.
    *A62C 3/08*        (2006.01)
    *A62C 3/06*        (2006.01)
    *H01M 8/0612*    (2016.01)
    *H01M 8/04014*   (2016.01)
    *H01M 8/04111*   (2016.01)

(52) U.S. Cl.
    CPC .... *H01M 8/04014* (2013.01); *H01M 8/04111* (2013.01); *H01M 8/0618* (2013.01); *B64D 2041/005* (2013.01); *Y02E 60/50* (2013.01); *Y02T 90/36* (2013.01)

(56) References Cited

U.S. PATENT DOCUMENTS

| | | | |
|---|---|---|---|
| 7,815,148 B2 | 10/2010 | Kwok | |
| 8,394,552 B2 * | 3/2013 | Gummalla | B64D 41/00 429/479 |
| 8,499,567 B2 | 8/2013 | Hagh et al. | |
| 2012/0325811 A1 | 12/2012 | Hagh et al. | |

\* cited by examiner

AIRCRAFT SYSTEMS AND METHODS WITH INTEGRATED TANK INERTING AND POWER GENERATION

TECHNICAL FIELD

The present invention generally relates to aircraft systems and methods, and more particularly relates to aircraft systems and methods for inerting a fuel tank.

BACKGROUND

Aircraft fuel tanks generally include a fuel portion containing liquid fuel and an ullage portion containing a mixture of air and fuel vapor. The ullage portion should be inerted to prevent or mitigate the possibility of igniting the air and fuel vapor mixture. Various inerting technologies have been employed to alter the chemical composition of the mixture. In particular, inerting may be achieved by either reducing the oxygen concentration to less than 12% by volume and/or reducing the fuel to air ratio to less than 0.03 by weight. As examples, such inerting techniques may include in-flight purging of fuel vapor from tanks and condensing the purged vapor to reduce the fuel to air ratio, or in-flight generation of inerting gas such as nitrogen or $CO_2$ and injection of the inert gas into the fuels tanks to reduce oxygen concentration.

Because these inerting techniques are performed in-flight, energy that would otherwise be available to power the aircraft may need to be used to inert the fuel tank, thus negatively impacting overall efficiency. Moreover, conventional inerting equipment also adds weight to an aircraft, which further impacts efficiency.

Accordingly, it is desirable to provide more effective and efficient inerting of aircraft fuel tanks. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a system is provided for inerting a fuel tank of an aircraft. The system includes a first compressor fluidly coupled to the fuel tank for removing an air and fuel vapor mixture from an ullage of the fuel tank. The system further includes a fuel processor fluidly coupled to the first compressor and configured to receive the air and fuel vapor mixture and to generate hydrogen from the air and fuel vapor mixture. The system further includes a fuel cell fluidly coupled to the fuel processor and configured to receive the hydrogen as anode fuel to produce electricity. The fuel cell generates an exhaust product. The system further includes a combustor fluidly coupled to the fuel cell and configured to combust the exhaust product to produce combustion gas, and a first heat exchanger fluidly coupled to the combustor and configured to cool the combustion gas into inerting gas for the fuel tank.

In accordance with an exemplary embodiment, a system for inerting a fuel tank of an aircraft is provided. The system includes a first compressor fluidly coupled to the fuel tank for removing an air and fuel vapor mixture from an ullage of the fuel tank. The system further includes a fuel processor fluidly coupled to the first compressor and configured to receive the air and fuel vapor mixture and to generate hydrogen from the air and fuel vapor mixture. The system further includes a fuel cell comprising an anode and a cathode, the fuel cell fluidly coupled to the fuel processor and configured to receive the hydrogen as anode fuel to produce electricity. The anode generates a first exhaust product. The system further includes an auxiliary power unit (APU) fluidly coupled to the fuel cell and configured to provide cathode air to the fuel cell. The cathode of the fuel cell generates a second exhaust product directed to the fuel tank as inerting gas.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
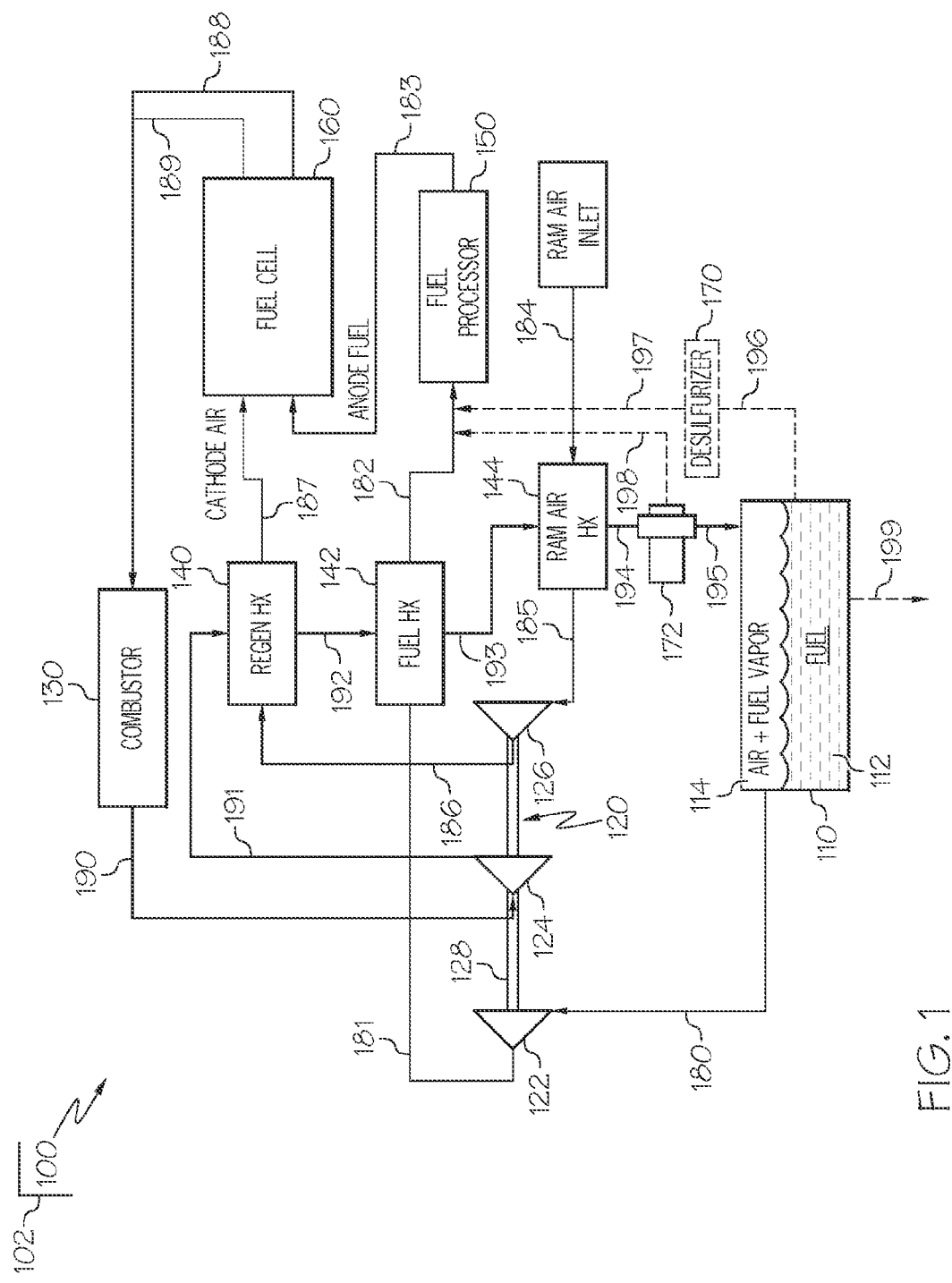
FIG. 1 is a schematic block diagram of an aircraft system for integrated inerting and power generation in accordance with an exemplary embodiment.

FIG. 1 is a schematic block diagram of an aircraft system 100 for integrated fuel tank inerting and power generation in accordance with an exemplary embodiment. The system 100 may be housed on an aircraft 102. Typically, the system 100 may be implemented on any type of aircraft, including fixed wing aircraft and helicopters.

As described in greater detail below, the system 100 functions to inert a fuel tank 110. As is generally known, the fuel tank 110 stores liquid fuel 112 for main or auxiliary aircraft engines (not shown). The portion of the fuel tank 110 that is not occupied by liquid fuel 112 is typically referred to as the ullage 114. The ullage 114 usually houses an air and fuel vapor mixture. During operation, this air and fuel mixture in the ullage 114 is inerted by system 100, as will now be described.

As shown in FIG. 1, the system 100 includes a fuel vapor compressor 122 that draws air and fuel vapor mixture 180 from the ullage 114 of the fuel tank 110. The fuel vapor compressor 122 compresses the air and fuel vapor mixture 180 and directs the resulting compressed mixture 181 to a first (or fuel) heat exchanger 142, which is described in greater detail below. In one exemplary embodiment, the fuel heat exchanger 142 functions to increase the temperature of the compressed mixture 181. The compressed mixture 181 flows through the fuel heat exchanger 142 and the resulting, higher temperature air and fuel vapor mixture 182 is directed to a fuel processor 150. The fuel processor 150 processes the air and fuel vapor mixture 182 to produce hydrogen 183, which is provided to a fuel cell 160 as anode fuel, as discussed in greater detail below.

As also shown in FIG. 1, RAM air 184 is directed through a RAM air inlet 146 and through a second (or RAM air) heat exchanger 144. In one exemplary embodiment, the second heat exchanger 144 functions to increase the temperature of RAM air 184. The resulting air flow 185 from the RAM air heat exchanger 144 is compressed by a compressor 126, and the compressed air 186 from the compressor 126 is directed to a third heat exchanger 140. In one exemplary embodiment, the heat exchanger 140 may be a regenerative heat exchanger 140 and will be referenced below as such. In one exemplary embodiment, the regenerative heat exchanger 140 functions to increase the temperature of the compressed air 186. The air flow from the regenerative heat exchanger 140 is directed to the fuel cell 160 as cathode air 187.

The fuel cell 160 may be any suitable type of fuel cell that converts chemical energy from a fuel into electricity through a chemical reaction with oxygen or another oxidizing agent, including proton exchange membrane (PEM) fuel cells, solid oxide fuel cell (SOFC), phosphoric acid fuel cells, and high temperature fuel cells. Generally, the fuel cell 160 has an anode and a cathode such that electrons are drawn from the anode to the cathode through an external circuit to produce electricity. In one exemplary embodiment, the hydrogen 183 is provided to the anode of the fuel cell 160 as fuel, and oxygen from the air 187 originating from the RAM air inlet 146 is provided to the cathode of the fuel cell 160 as the oxidizing agent. The electricity from the resulting chemical reaction may be used to power various aircraft systems or components.

The fuel cell 160 also generates exhaust products 188, 189 from the anode and cathode. The exhaust products 188, 189 are directed to a combustor 130. Typically, the exhaust product 188 of the anode includes the excess or unused portions of the air and fuel vapor mixture from the ullage 114, and the exhaust product 189 from the cathode includes the excess or unused portions of the RAM air 184 and water. The exhaust products 188, 189 are ignited and burned in the combustor 130 to produce combustion gas 190. The combustion gas 190 functions to drive a turbine 124 for power extraction. In turn, the turbine 124 may drive, for example, the compressors 122, 126 via a shaft 128. Thus, during operation, the combustor 130 and turbine 124 may maintain sustainable operation of the system 100 by driving the compressors 122, 126. Rotation of the turbine 124 may further produce electricity to power other aircraft systems. In addition to driving the turbine 124, igniting the exhaust products 188, 189 in the combustor 130 also functions to burn off any excess or remaining fuel in the mixture and produces carbon dioxide for inerting, as discussed below.

The combustion gas 190 exits the turbine 124 as exhaust gas 191 and is directed to the regenerative heat exchanger 140. The turbine exhaust gas 191 is at least partially cooled by regenerative heat exchanger 140 by transferring at least some of the heat to the air flow 187 directed to the fuel cell 160, discussed above. Exhaust gas 192 from the regenerative heat exchanger 140 is further at least partially cooled by the fuel heat exchanger 142 by transferring at least some of the heat to the air and fuel vapor mixture 182 prior to flowing into the fuel processor 150, also discussed above. Exhaust gas 193 from the fuel heat exchanger 142 is further at least partially cooled by the RAM air heat exchanger 144 by transferring at least a portion of the heat to the RAM air 185, also discussed above. Exhaust gas 194 from the RAM air heat exchanger 144 is directed to a water extractor 172 to remove excess water 198. The excess water 198 is provided to the fuel processor 150, while preventing or minimizing water from flowing into the fuel tank 110, thereby reducing the possibility of water condensation and corrosion in the fuel tank 110. The fuel processor 150 may be any suitable type of fuel processor that converts fuel and water mixture into hydrogen through a chemical reaction with oxygen or another oxidizing agent, including authothermal reformer.

After the water is extracted, exhaust gas 195 is used to inert the fuel tank 110. As such, the exhaust from the combustor 150, after driving the turbine 124 and being cooled by the heat exchangers 140, 142, 144, provides an inerting gas to the fuel tank 110. In particular, the exhaust gas 195 is primarily carbon dioxide that functions to reduce the oxygen concentration in the ullage 114. In one exemplary embodiment, the exhaust gas 195 reduces the oxygen concentration to less than 12% by volume.

At times, liquid fuel 196 may be necessary as fuel to maintain operation of the fuel cell 160. As an example, liquid fuel 196 may be necessary when the mixture in the ullage 114 is relatively lean, e.g., with a fuel to air mass ratio of less than about 0.1, such that there is insufficient fuel in the mixture to maintain the reaction in the fuel cell 160. In such instances, liquid fuel 196 is processed by a desulfurizer 170, and the resulting desulfurized liquid fuel 197 is processed by the fuel processor 150 to result in anode fuel 183 for the fuel cell 160.

The system 100 may be operated as necessary or desired. In one exemplary embodiment, the system 100 may be operated in a full-time mode in which inerting gas and power are generated throughout the flight. Such full-time operation may avoid start-up and shutdown transients while providing simple controls and consistent power generation. In other embodiments, the system 100 may only be operated when the oxygen concentration in the ullage 114 reaches a predetermined high concentration. Although not shown, the system 100 may include a control unit to manage operation.

In addition to those previously mentioned, the system 100 provides a number of advantages. For example, the system 100 uses RAM air from the atmosphere as opposed to cabin air. This results in more efficient operation in that air from the main engines (e.g., that supply cabin air) is not diverted from the outflow valve with the associated reduction in thrust. Moreover, the heat exchangers 140, 142, 144 function to advantageously increase temperature for the flows directed to the fuel cell 160, which operates at approximately 650° C. to approximately 900° C., and the fuel processor 150, which operates at approximately 400° C., while correspondingly decreasing the temperature of the flow diverted back into the fuel tank 110. The aircraft system 100 is preferable to other, conventional inerting systems, such as air separation membranes or passive inerting system using bottled gas and/or foam systems. As an example, using the vaporized fuel from the ullage 114 increases the system efficiency for power generation since energy is not required to vaporize the liquid fuel. As noted below, the use of fuel vapor in the mixture reduces sulfur loading on the fuel cell 160. The integrated inerting and power generation may result in lighter, smaller, more environmentally friendly, and cheaper systems as compared to conventional approaches.

Figure 2:
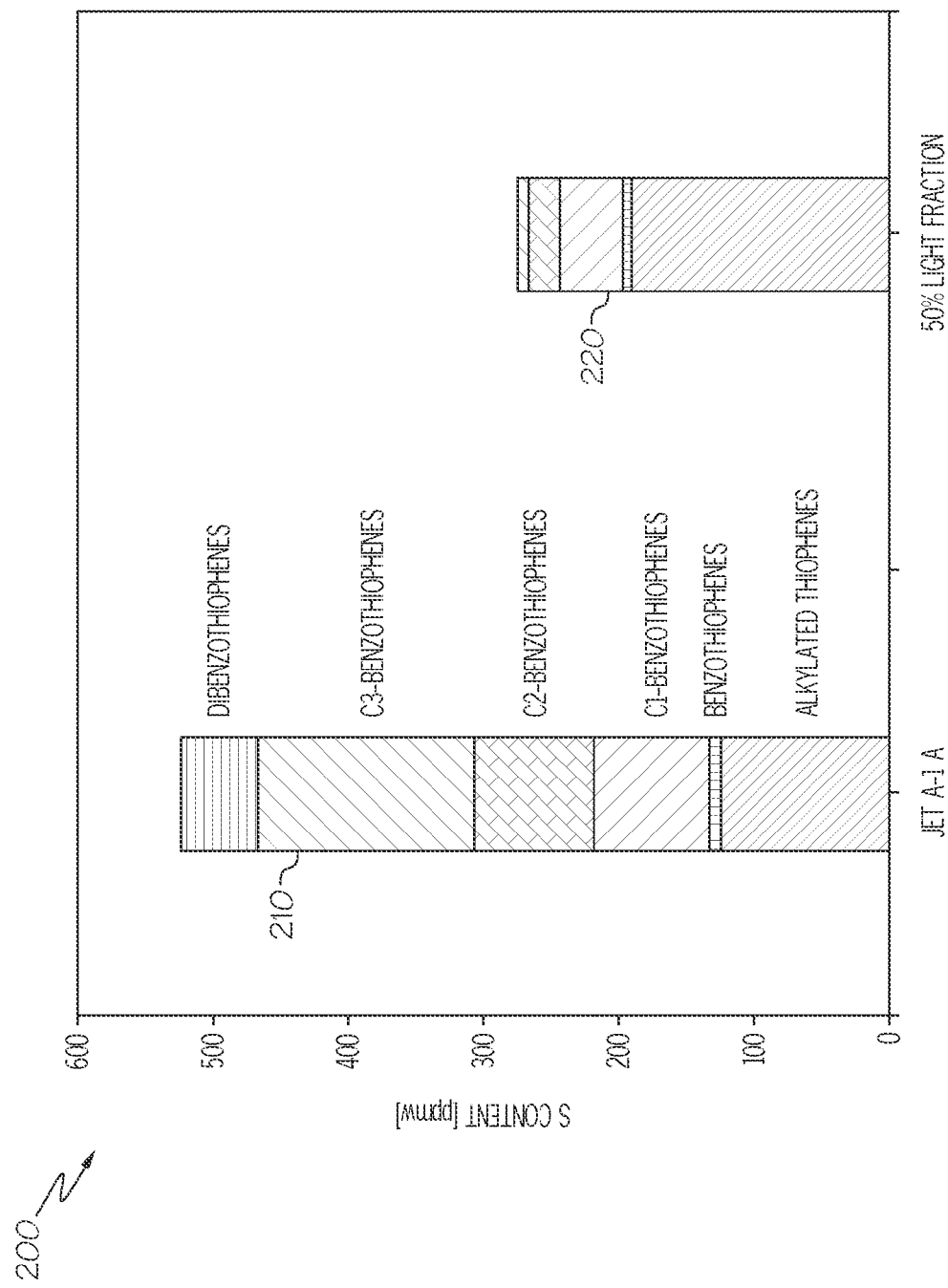
FIG. 2 is a chart comparing sulfur content between liquid fuel and an air and fuel vapor mixture in the aircraft system of FIG. 1 in accordance with an exemplary embodiment.

An additional advantage is shown in the chart 200 of FIG. 2. FIG. 1 is referenced in the discussion of the chart 200 of FIG. 2 below. The chart 200 of FIG. 2 depicts a comparison between the sulfur content of liquid fuel, represented by bar 210, and the sulfur content of the vapor fuel from the mixture removed from the ullage 114, represented by bar 220. Generally, sulfur is undesirable and potentially damaging to fuel cells unless removed or minimized. As shown, the sulfur content 210 of liquid fuel us substantially greater than the sulfur content 220 of the mixture. In one exemplary embodiment, the sulfur content 220 of the ullage 114 may be 50% less. As such, using the mixture from the ullage 114 reduces the amount of sulfur loading on fuel cell 160, as compared to the use of liquid fuel. In one exemplary embodiment, only the portion of the liquid fuel used during lean conditions, referenced above, requires the use of a desulfurizer 170. This results in a reduction in size of the desulfurizer 170 than would otherwise be necessary since the mixture from the ullage 114 functions as the primary fuel source. In some embodiments, the desulfurizer 170 may be eliminated, particularly if a low sulfur or sulfur-free fuel is used, such as a biofuel. In another embodiment, the liquid fuel injection could be eliminated by bypassing the fuel cell for flight segments where fuel to air mixture in the ullage is lean.

FIGS. 3-6 are charts 300, 400, 500, 600 depicting a dynamic system analysis for a flight profile using the aircraft system 100 of FIG. 1 in accordance with an exemplary embodiment. The flight profile of FIGS. 3-6 represents a ground idle to landing profile for a narrow body aircraft with center and wing tanks initialized at 60% full by volume having a constant fuel consumption rate of 9.7 gallons/minute and an ullage mixture recirculation flow rate set at 5 pounds/minute. The flight profile is merely an example, and the system 100 discussed above may be implemented in association with any suitable type of flight profile.

Figure 3:
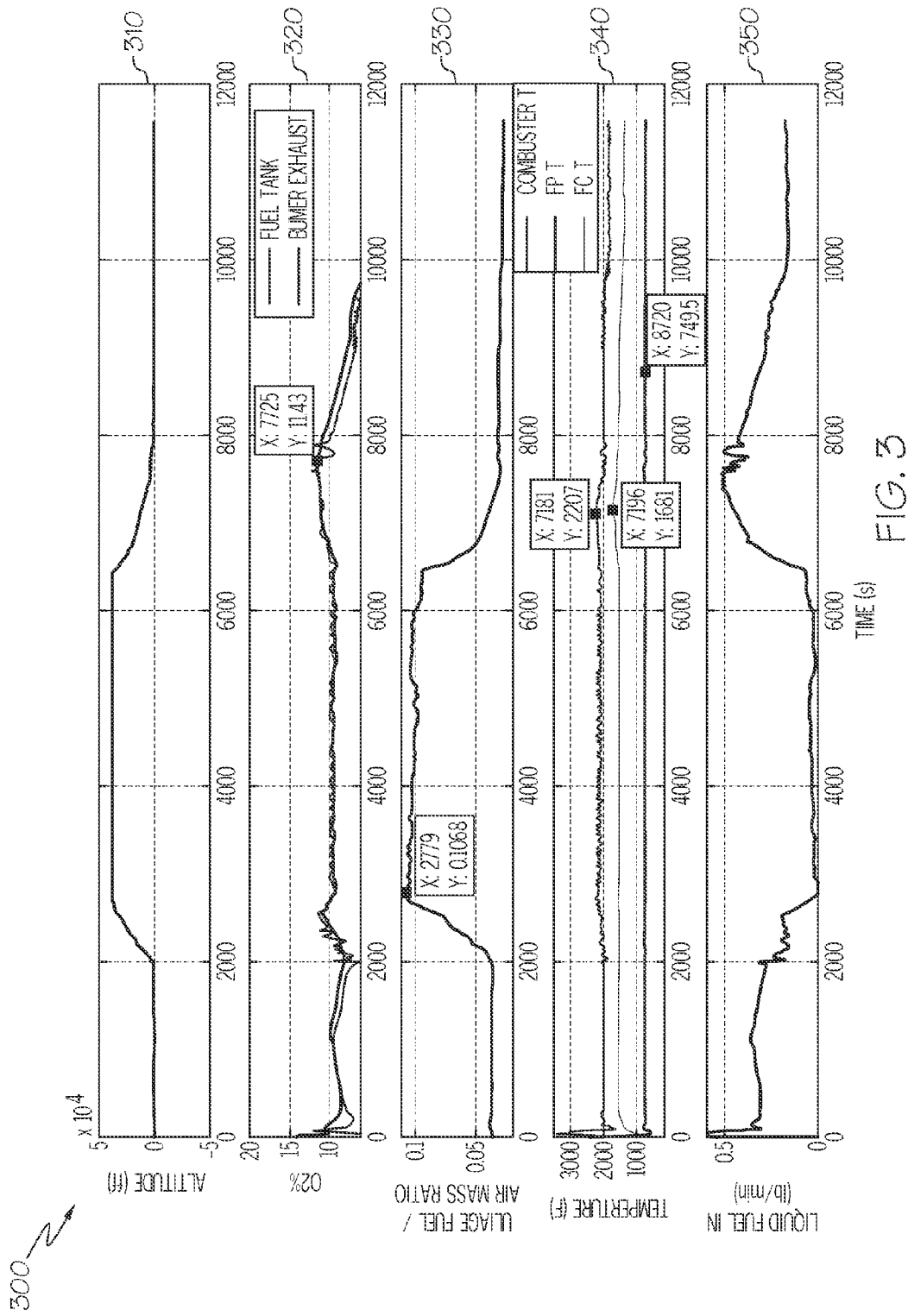
FIGS. 3-6 are charts depicting a dynamic system analysis for a flight profile using the aircraft system of FIG. 1 in accordance with an exemplary embodiment.

FIG. 3 particularly depicts a chart 300 with portions 310, 320, 330, 340, 350 representing altitude, oxygen concentration in the tank, ullage fuel to air ratio, temperature, and a liquid fuel flow rate, respectively, over time. As shown in portion 310, the aircraft system 100 may maintain an oxygen concentration of less than 12% throughout flight. As shown in portion 340, the temperature of the combustor is generally less than 2200° F., which typically would not necessitate the use of exotic or expensive materials. As shown in portion 350, liquid fuel is generally not necessary during flight, thereby reducing the amount of liquid fuel used to about 38.7 pounds.

Figure 4:
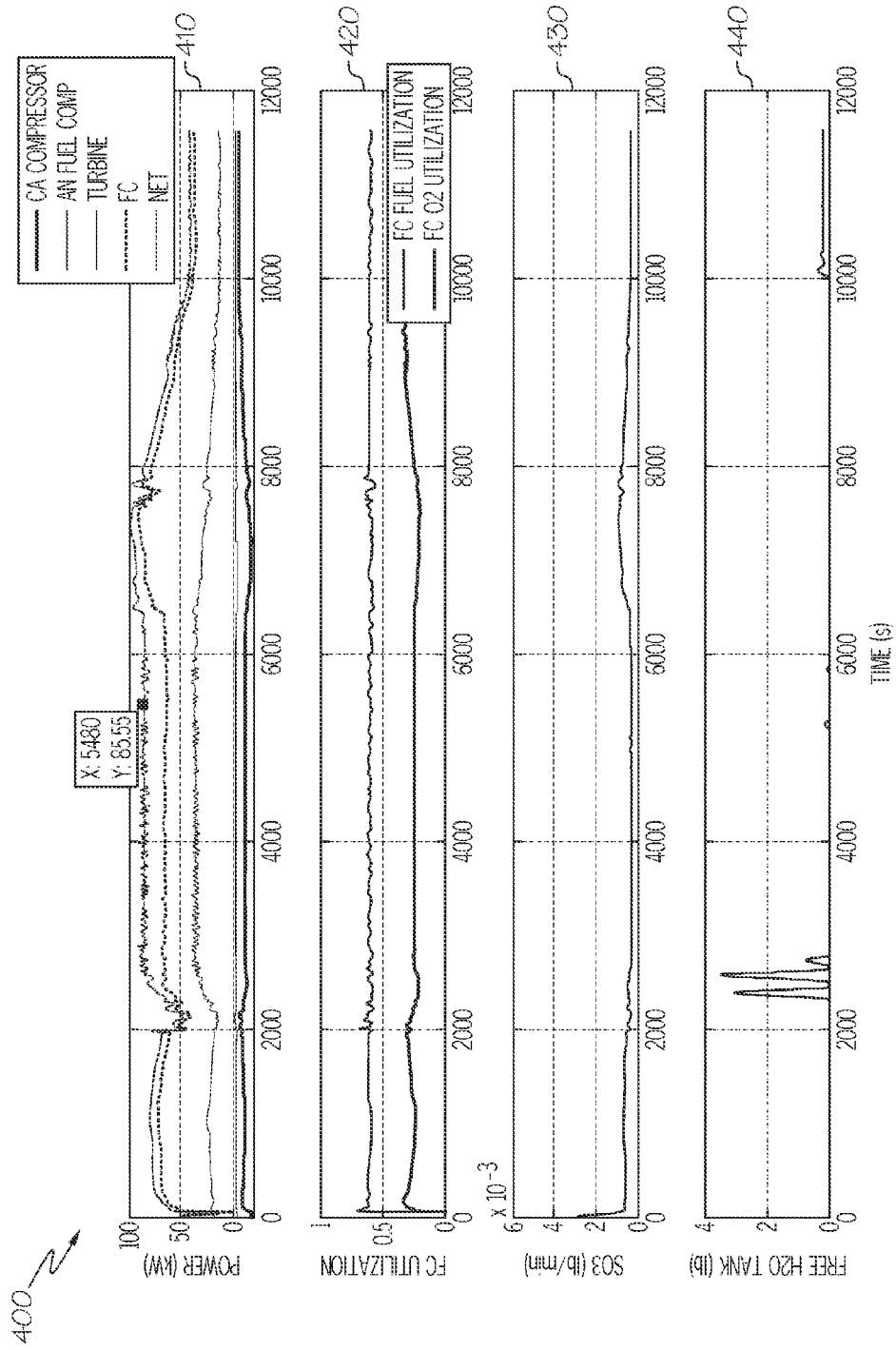

FIG. 4 particularly depicts a chart 400 with portions 410, 420, 430, 440 representing power, fuel cell utilization, sulfur emissions, and water in the tank, respectively, over time. As shown in portion 410, the power generation and consumption of the turbine and compressors provides a maximum net power of 85.5 kW. Portions 430 and 440 indicate that sulfur and water generation are minimized.

Figure 5:
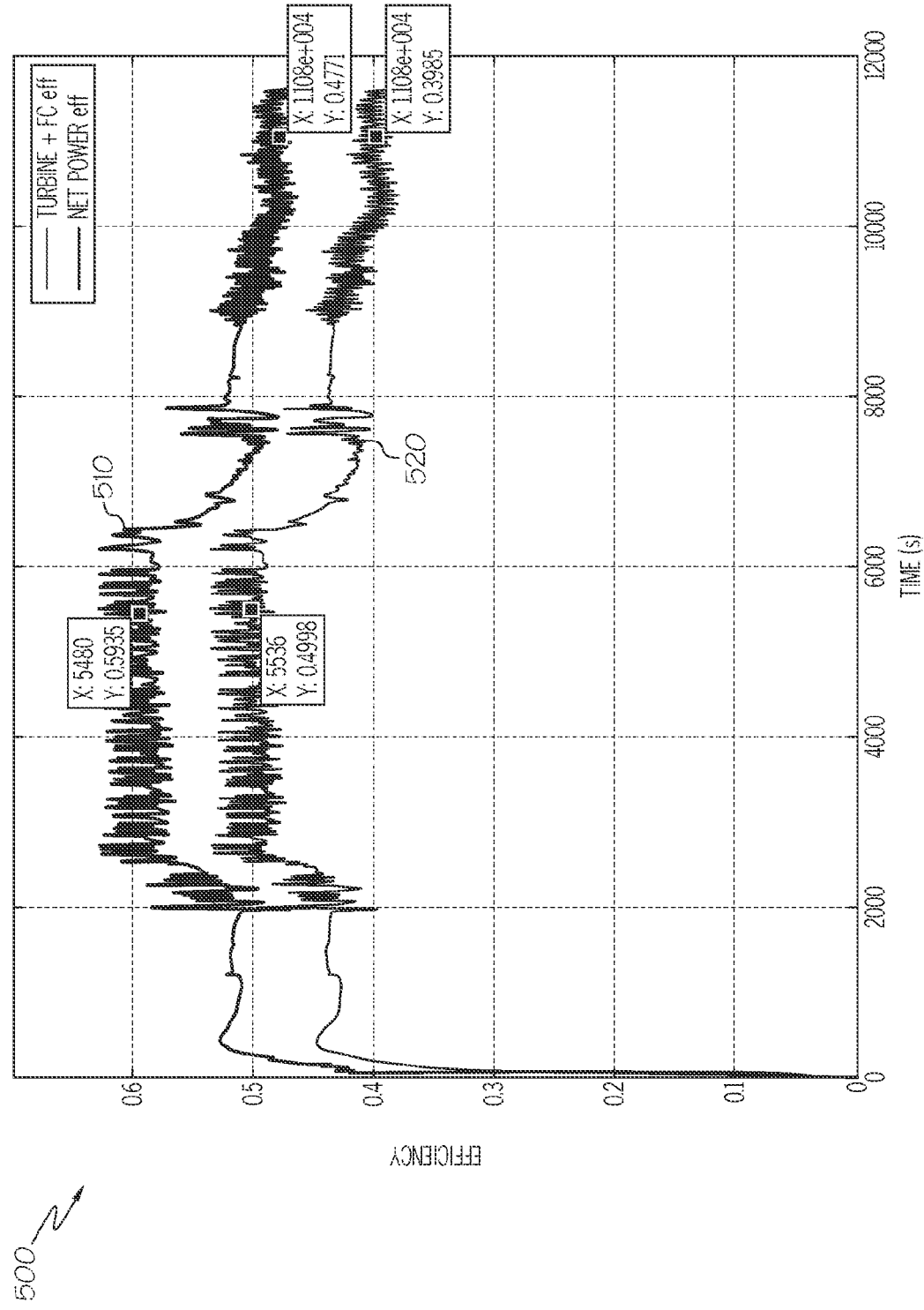

FIG. 5 is a chart 500 with the turbine and fuel cell efficiency 510 and the net power efficiency 520. The net system efficiency is in the range of 40 to 50% defined as ratio of net DC power generated to LHV of jet fuel drawn from fuel tank as liquid or vapor.

Figure 6:
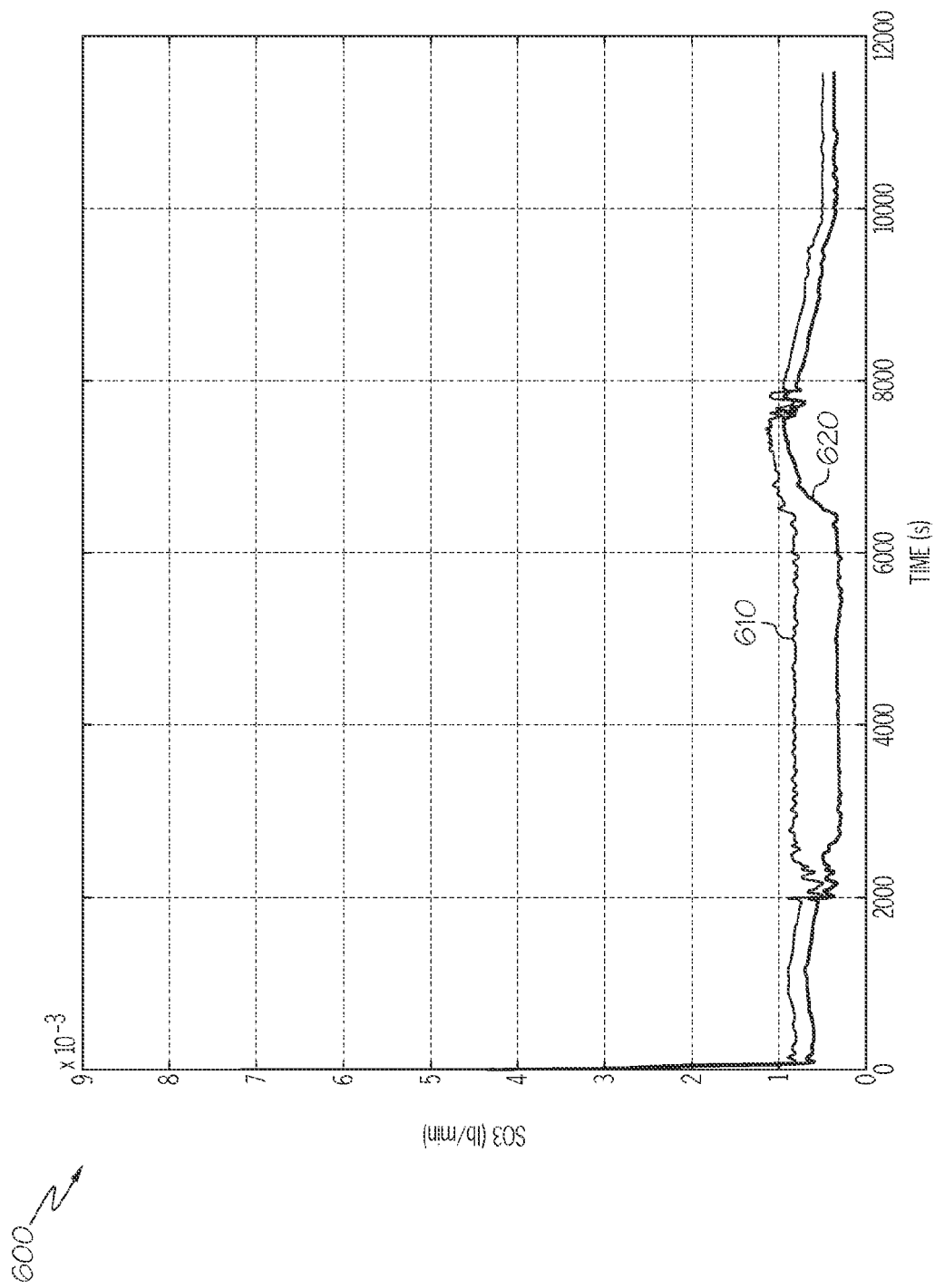

FIG. 6 is a chart 600 depicting a comparison between the resulting sulfur emissions 610 associated with the use of liquid fuel and sulfur emission 620 associated with the use of ullage vapor. Assuming a fuel sulfur content of 3,000 ppm by weight as benzothiophene, FIG. 6 indicates that using air and fuel vapor mixture from ullage reduces sulfur load by 0.057 pounds, resulting in about 62% sulfur loading to the fuel processor as compared to using all liquid fuel.

Figure 7:
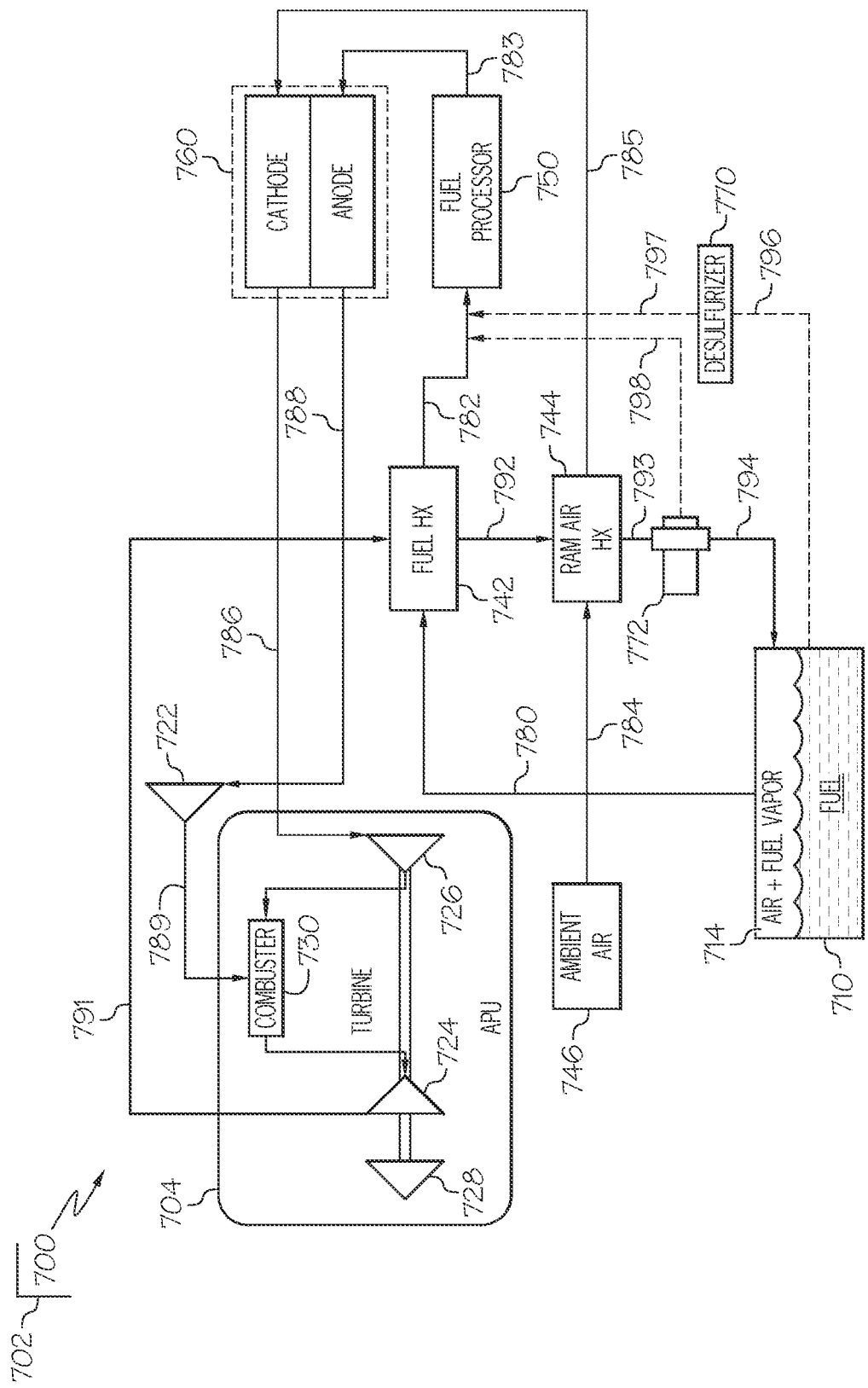
FIG. 7 is a schematic block diagram of an aircraft system for integrated inerting and power generation in accordance with another exemplary embodiment.

FIG. 7 is a schematic block diagram of an aircraft system 700 for integrated inerting and power generation in accordance with another exemplary embodiment. Except for the differences noted below, the system 700 operates in a similar manner to the system 100 discussed above. System 700 combines the advantageous features of a low temperature fuel cell and a gas turbine auxiliary power unit (APU), high efficiency and high power density respectively. Polymer exchange membrane (PEM) is an example of a low temperature fuel cell typically operating more than 80° C.

As shown in FIG. 7, the system 700 includes a fuel vapor compressor 722 that draws air and fuel vapor mixture 780 from the ullage 714 of the fuel tank 710. Initially, the air and fuel mixture 780 is directed into a fuel heat exchanger 742 that functions to increase the temperature of the mixture 780. The resulting, higher temperature air and fuel vapor mixture 782 is directed to a fuel processor 750. The fuel processor 750 processes the air and fuel vapor mixture 782 to produce hydrogen 783, which is provided to a fuel cell 760 as anode fuel. The fuel vapor compressor 722 compresses the exhaust product 788 from the anode of the fuel cell 760, and the resulting compressed exhaust product 789 is directed to an auxiliary power unit (APU) 704 of the aircraft 702.

As also shown in FIG. 7, RAM air 784 is directed through a RAM air inlet 746 and a heat exchanger 744 that functions to increase the temperature of the RAM air 784. The resulting, higher temperature RAM air 785 is directed into the fuel cell 760 as cathode air. The exhaust product 786 from the cathode of the fuel cell 760 is directed to the APU 704 of the aircraft 702.

As in a typical APU configuration, the APU 704 includes a combustor 730, a turbine 724, and compressors 726, 728. Generally, air is drawn in and compressed in compressors 726, 728, ignited and combusted in the combustor 730, and the resulting combustion gas is used to drive the turbine 724. The power extracted in the turbine 724 may be used to power various aircraft systems, particularly when the aircraft is on the ground. As described below, the APU 704 is integrated into the inerting system 700 to inert the fuel tank 710 while generating power for the aircraft 702.

As noted above, the APU 704 receives the exhaust product 788 (via compressor 722 as exhaust product 789) from the anode of the fuel cell 760 and exhaust product 786 from the cathode of the fuel cell 760. In particular, the compressed exhaust product 789 from the anode is directed into the combustor 730, and exhaust product 786 from the cathode is directed into the compressor 726 of the APU 704 and subsequently compressed and directed to the combustor 730. The exhaust product 789 may be mixed with fuel and ignited in the combustor 730, and the resulting combustion gases drive the turbine 724.

The combustion gas exits the turbine 724 as exhaust gases 791 and is directed to the fuel heat exchanger 742. The exhaust gas 791 is cooled by transferring at least some of the heat to the air and fuel mixture 782 directed to the fuel processor 150, discussed above. Exhaust gas 792 from the fuel heat exchanger 742 is further at least partially cooled by the RAM air heat exchanger 744 by transferring at least a portion of the heat to the RAM air 785 directed to the cathode of the fuel cell 760, also discussed above. Exhaust gas 793 from the RAM air heat exchanger 744 is directed to a water extractor 772 to remove excess water 798. The excess water 798 is provided to the fuel processor 750. After the water is extracted, exhaust gases 794 are used to inert the fuel tank 110. As such, the exhaust from the combustor 730 of the APU 704, after driving the turbine 724 and being cooled by the heat exchangers 742, 744, provides an inerting gas to the fuel tank 110.

At times, liquid fuel may be necessary as fuel to maintain operation of the fuel cell 760. As an example, liquid fuel may be necessary when the mixture in the ullage 714 is relatively lean. In such instances, liquid fuel 796 is processed by a desulfurizer 770, and the resulting desulfurized liquid fuel 797 is processed by the fuel processor 750 to result in anode fuel 783 for the fuel cell 760.

Figure 8:
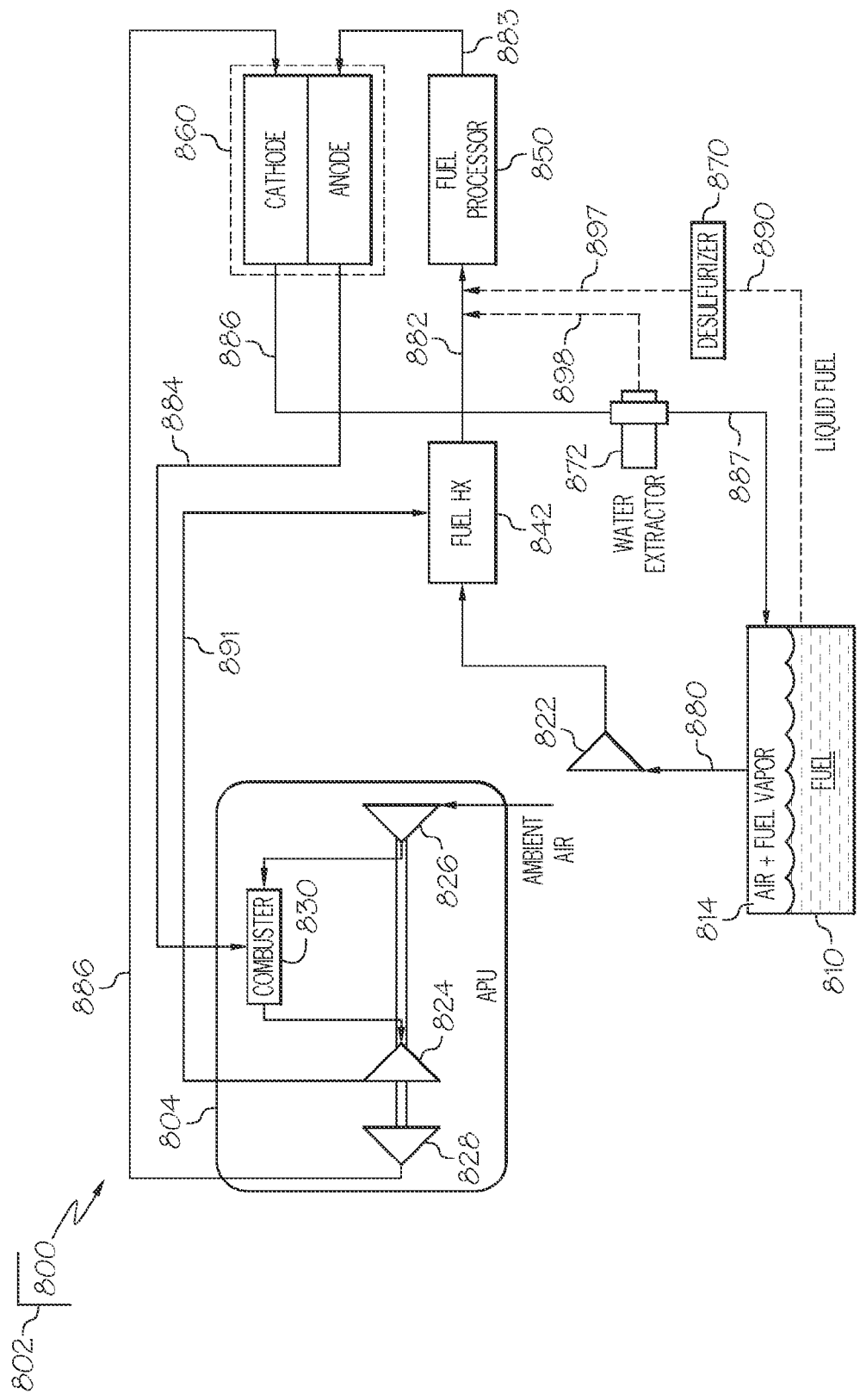
FIG. 8 is a schematic block diagram of an aircraft system for integrated inerting and power generation in accordance with another exemplary embodiment.

FIG. 8 is a schematic block diagram of an aircraft system 800 for integrated inerting and power generation in accordance with another exemplary embodiment. Except for the differences noted below, the system 800 operates in a similar manner to the systems 100, 700 discussed above.

As shown in FIG. 8, the system 800 includes a fuel vapor compressor 822 that draws air and fuel vapor mixture 880 from the ullage 814 of the fuel tank 810. Initially, the air and fuel mixture 880 is directed into a fuel heat exchanger 842 that functions to increase the temperature of the mixture 880. The resulting, higher temperature air and fuel vapor mixture 882 is directed to a fuel processor 850. The fuel processor 850 processes the air and fuel vapor mixture 882 to produce hydrogen 883, which is provided to a fuel cell 860 as anode fuel. The resulting compressed exhaust product 884 is directed to an auxiliary power unit (APU) 804 of the aircraft 802.

The APU 804 is described above and includes a combustor 830, a turbine 824, and compressors 826, 828. Air is drawn in and compressed in compressors 826, 828, ignited and combusted in the combustor 830, and the resulting combustion product is used to drive the turbine 824. The power extracted in the turbine 824 may be used to power various aircraft systems, particularly when the aircraft is on the ground. In this embodiment, the air drawn into compressor 826 may be ambient air.

In this embodiment, air 885 is drawn from the load compressor 828 of the APU 804 and directed to the fuel cell 860 as cathode air.

As noted above, the exhaust product 884 from the anode of the fuel cell 860 is directed to the APU 804. In particular, the exhaust product 884 is directed into the combustor 830. The exhaust products 884 may be mixed with fuel and ignited in the combustor 830, and the resulting combustion gases drive the turbine 824.

The combustion gas exits the turbine 824 as exhaust gas 891 and is directed to the fuel heat exchanger 842. The exhaust gas 891 is cooled by transferring at least some of the heat to the air and fuel vapor mixture 882 directed to the fuel processor 850, discussed above. The exhaust combustion products from APU may be dumped overboard.

In this exemplary embodiment, the exhaust product 886 from the cathode of the fuel cell 860 is directed to a water extractor 872 to remove excess water 898. The excess water 898 is provided to the fuel processor 850. After removing the water, exhaust product 887 is used to inert the fuel tank 810. As such, the exhaust from the cathode of the fuel cell 860 provides nitrogen enriched air as an inerting gas to the fuel tank 810. In one exemplary embodiment, the exhaust gas 887 reduces the oxygen concentration to less than 12% by volume.

At times, liquid fuel may be necessary as fuel to maintain operation of the fuel cell 860. In such instances, liquid fuel 896 is processed by a desulfurizer 870, and the resulting desulfurized liquid fuel 897 is processed by the fuel processor 850 to result in anode fuel 883 for the fuel cell 860.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for inerting a fuel tank of an aircraft, comprising:
    a first compressor fluidly coupled to the fuel tank for removing an air and fuel vapor mixture from an ullage of the fuel tank;
    a fuel processor fluidly coupled to the first compressor and configured to receive the air and fuel vapor mixture and to generate hydrogen from the air and fuel vapor mixture;
    a fuel cell fluidly coupled to the fuel processor and configured to receive the hydrogen as anode fuel to produce electricity, the fuel cell generating an exhaust product;
    a combustor fluidly coupled to the fuel cell and configured to combust the exhaust product to produce combustion gas; and
    a first heat exchanger fluidly coupled to the combustor and configured to cool the combustion gas into inerting gas for the fuel tank.

2. The system of claim 1, further comprising
    a second compressor configured to receive RAM air, the second compressor fluidly coupled to the fuel cell to provide the RAM air to the fuel cell as cathode air.

3. The system of claim 2, further comprising a turbine fluidly coupled between the combustor and the first heat exchanger and configured to extract power from the combustion gas to drive the first compressor and the second compressor.

4. The system of claim 3, wherein the second compressor is coupled to the first heat exchanger such that heat is transferred from the combustion gas to the RAM air.

5. The system of claim 4, further comprising a second heat exchanger fluidly coupled between the first heat exchanger and the fuel tank to further cool the inerting gas for the fuel tank.

6. The system of claim 5, wherein the second heat exchanger is additionally fluidly coupled between the first compressor and the fuel processor such that heat is transferred between the air and fuel vapor mixture and the inerting gas.

7. The system of claim 6, further comprising a RAM air inlet to receive the RAM air and direct the RAM air to the second compressor.

8. The system of claim 7, further comprising a third heat exchanger fluidly coupled between the second heat exchanger and the fuel tank to further cool the inerting air.

9. The system of claim 8, wherein the third heat exchanger is additionally fluidly coupled between the second compressor and the RAM air inlet such that heat is transferred between the RAM air and the inerting gas.

10. The system of claim 9, further comprising a water extractor fluidly coupled between the third heat exchanger and the fuel tank to remove water from the inerting gas.

11. The system of claim 10, wherein the water extractor is additionally fluidly coupled to the fuel processor and configured to provide the water to the fuel processor.

12. The system of claim 11, further comprising a desulfurizer coupled to the fuel processor and the fuel tank, the desulfurizer configured to direct liquid fuel from the fuel tank to the fuel processor.

13. The system of claim 1, wherein the combustor is an auxiliary power unit (APU) combustor.

14. The system of claim 1, wherein the first compressor is fluidly coupled between the fuel cell and the combustor.

* * * * *